(12) United States Patent
Mehrabanzad et al.

(10) Patent No.: US 6,404,807 B1
(45) Date of Patent: Jun. 11, 2002

(54) HIGH SPEED DIAL-UP SERVICE USING PCM MODEM TECHNOLOGY

(75) Inventors: Sepehr Mehrabanzad, Southborough; Minh Hoang, Stoughton, both of MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/498,105

(22) Filed: Feb. 4, 2000

(51) Int. Cl.[7] .............................. H04L 5/16; H04L 23/00
(52) U.S. Cl. ...................... 375/222; 375/377; 370/465
(58) Field of Search ................................ 375/222, 377, 375/219; 379/93.01; 370/464, 465

(56) References Cited

U.S. PATENT DOCUMENTS

| | | | | |
|---|---|---|---|---|
| 4,890,303 A | * | 12/1989 | Bader | 375/356 |
| 5,199,046 A | | 3/1993 | Ling | 375/222 |
| 5,237,561 A | * | 8/1993 | Pyhalammi | 375/222 |
| 5,278,865 A | * | 1/1994 | Amrany et al. | 375/222 |
| 5,394,437 A | * | 2/1995 | Ayanoglu et al. | 375/222 |
| 5,463,661 A | * | 10/1995 | Moran, III et al. | 375/222 |
| 5,528,679 A | * | 6/1996 | Taarud | 379/93.01 |
| 5,724,393 A | * | 3/1998 | Dagdeviren | 375/222 |
| 5,757,849 A | * | 5/1998 | Gelblum et al. | 375/222 |
| 5,801,695 A | * | 9/1998 | Townshend | 375/242 |

OTHER PUBLICATIONS

PCT International Search Report, PCT/US01/03341 filed Feb. 1, 2001, 3 pgs.
Bernard Sklar "Digital Communications Fundamental and Applications," pp 73–78, Prentice Hall, 1988.*

* cited by examiner

Primary Examiner—Tesfaldet Bocure

(57) ABSTRACT

A method and apparatus for achieving the fastest possible data transmission rate, symmetric, near symmetric, or a specific data transmission rate between multiple analog modems. The invention comprises a multimedia unit comprising of two (or more) digital modems and a controller section. The controller provides the interface between the two (or more) digital modems. When a user attempts to send data from a first analog modem to a second analog modem, the user calls the first digital modem in the network. Next, the first digital modem establishes a connection with the second digital modem through the controller section which is partitioned in two segments. Controller segments may be co-located or located in different locations and connected through either Internet or PSTN. Then, the second digital modem dials up the second analog modem under direction of the controller. Subsequently, the controller commands the digital modems to establish a connection at the fastest possible symmetric rate, near-symmetric, or any other pre-configured rate. Last, the controller bridges traffic between the digital modems and enables the two analog modems to communicate transparently.

13 Claims, 3 Drawing Sheets

HIGH SPEED DIAL-UP SERVICE USING PCM MODEM TECHNOLOGY

FIELD OF THE INVENTION

This invention is directed towards data communications over telephony and network systems, and more particularly towards dial-up services using PCM modem technology.

BACKGROUND OF THE INVENTION

Improved Modem technology has greatly increased the speed in which data may be transmitted and received over point to point and multipoint connections. Modems that operate on digital connections (for example DSL, ISDN, etc.) can provide high throughput with minimal errors. However, for modems used over POTS (Plain Old Telephone System) lines, digital modems are not an option. Portions of PSTN (Public Switched Telephone Network) in the world still utilize analog lines, often in the form of twisted-pair copper wire carrying analog signals. Even if telephone central offices (COs) have a digital infrastructure through digital switches and backbones, the connections from the CO to residences are still over analog local loops. The analog local loop segment of POTS from CO to the residence which is referred to in the art as the "last-mile" requires the use of analog modems for data connections. Digital connections using xDSL technologies maybe possible to connect the residences to COs, however, there are many restrictions, the services are usually at higher cost, and are not as widely available.

Currently, symmetric or asymmetric point-to-point analog dial-up connections up to 33.6 kbps (KiloBits Per Second) are possible using ITU (International Telecommunications Union) Recommendation V.34 modems. However, due to various impairments encountered connection rates may not be as high. Therefore, applications such as video communication (even with compression) may not be suitable for dial-up connections using V.34 speeds.

Given that the majority of today's network is digital in nature, the newly adopted Standard ITU Recommendation V.90 utilizes the digital portions of the telephone network to provide data rates of up to 56 kbps (with theoretical speed limit of 64 kbps) in the downstream direction. The V.90 Standard incorporates Pulse Code Modulation (PCM) for the downstream direction of the data call to achieve the fastest data transmission rates possible. Due to technical challenges and the degree of difficulty, PCM was not considered in ITU Recommendation V.90 for the upstream direction. Instead, the upstream modulation is performed according to ITU Recommendation V.34, which has data transmission rate limits as previously described.

ITU Recommendation V.90 provides asymmetrical data transmission rates that are quite appealing to Internet Service Providers (ISP) and clients when it comes to web browsing applications. In this context, the downstream direction is from a server to a client or user, and the upstream direction is from the client or user to the server.

ITU Recommendation V.90 specifies that network topology is such that one end is connected to the network digitally. Hence, rates and modulation schemes as defined by ITU Recommendation V.90 are not applicable when both ends are connected to the network via analog local loop. This is the case for majority of the residual users. Also, asymmetrical data transmission rates limit the usefulness of V.90 modems when it comes to applications such as interactive data services like video calls and interactive on-line gaming that require a fast connection rate in both the downstream and upstream directions.

As technologies continue to become more interactive, a premium may be placed on data transmission services that can provide near symmetrical rates, especially when both ends of the call are connected to network over POTS line. Consequently, the present model will become insufficient.

SUMMARY OF THE INVENTION

A method and apparatus are provided for achieving the fastest possible symmetric, near-symmetric, or user-configured data transmission rates between end sites which are connected to the network over POTS line and thereby require analog modems. The present invention includes a device, called a Multimedia Unit (MU), that takes advantage of PCM modem technology in both directions of the call to establish an appropriate (near symmetrical or nonsymmetrical) data transmission rate over point-to-point or multipoint dial-up connection. It can be located either at the phone company, Internet Service Provider (ISP), or a stand-alone gateway.

According to the present invention, MU is comprised of two digital modems (a first digital modem and a second digital modem) and a controller. The first and second digital modems and the controller may be physically co-located, or, may be partitioned into two sections. Each partition comprises a digital modem and a controller section. These partitions may be co-located or separated across the network. The controller sections can stay in contact via different means. For instance, direct wire in case of stand alone, and via Internet, or PSTN (Public Switched Telephone Network, also known as GSTN, General Switched Telephone Network) for the distributed case.

When a user wishes to establish a connection from a first analog modem to a second analog modem, the first analog modem calls the first digital modem. Next, the first digital modem establishes a connection with a second digital modem through the controller section. Then the second digital modem under direction of the controller section dials up the second analog modem. Subsequently, the controller instructs the digital modems to establish a connection at an appropriate or selectable data transmission rate. The first analog modem may dial the number to the second analog modem plus a prefix that will indicate to the controller the type of connection. Description and means to request such services are described in co-pending U.S. patent application Ser. No. 09/479,679 filed on Jan. 7, 2000 entitled "A METHOD AND APPARATUS FOR PROVIDING AN AUTOMATED SELECTION OF A TELECOMMUNICATION SERVICE FROM AMONG A PLURALITY OF TELECOMMUNICATION SERVICES", assigned to Motorola, Inc. and incorporated herein by reference.

Depending on the requirements, this data transmission rate may be the fastest possible symmetric rate, which corresponds to the slowest analog modem transmit rate. Other possible data transmission rates include near-symmetrical, non-symmetrical, or user configured rates.

Advantages of the present invention include the ability to utilize Pulse Code Modulation (PCM) in the upstream direction to achieve fast data transmission rates. This in turn allows for providing the fastest possible symmetric or near-symmetric data transmission rates between two or more analog modems. Alternatively, it enables the user to request a specific type of connection. For example, a user can request a connection to handle video stream, or simply request a connection that meets the requirements for voice. The different type of service can be requested by means disclosed in the patent application Ser. No. 09/479,679, described hereinbefore, by dialing a certain prefix before the phone number. Telephone companies' tariffs may change to account for the different type of dial-up services based on the connection rates.

Other advantages include the ability to perform point-to-multipoint connections utilizing PSTN digital infrastructure, but where the "last mile" connections are still analog connections and end points are connected to the network over POTS lines via analog modems.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
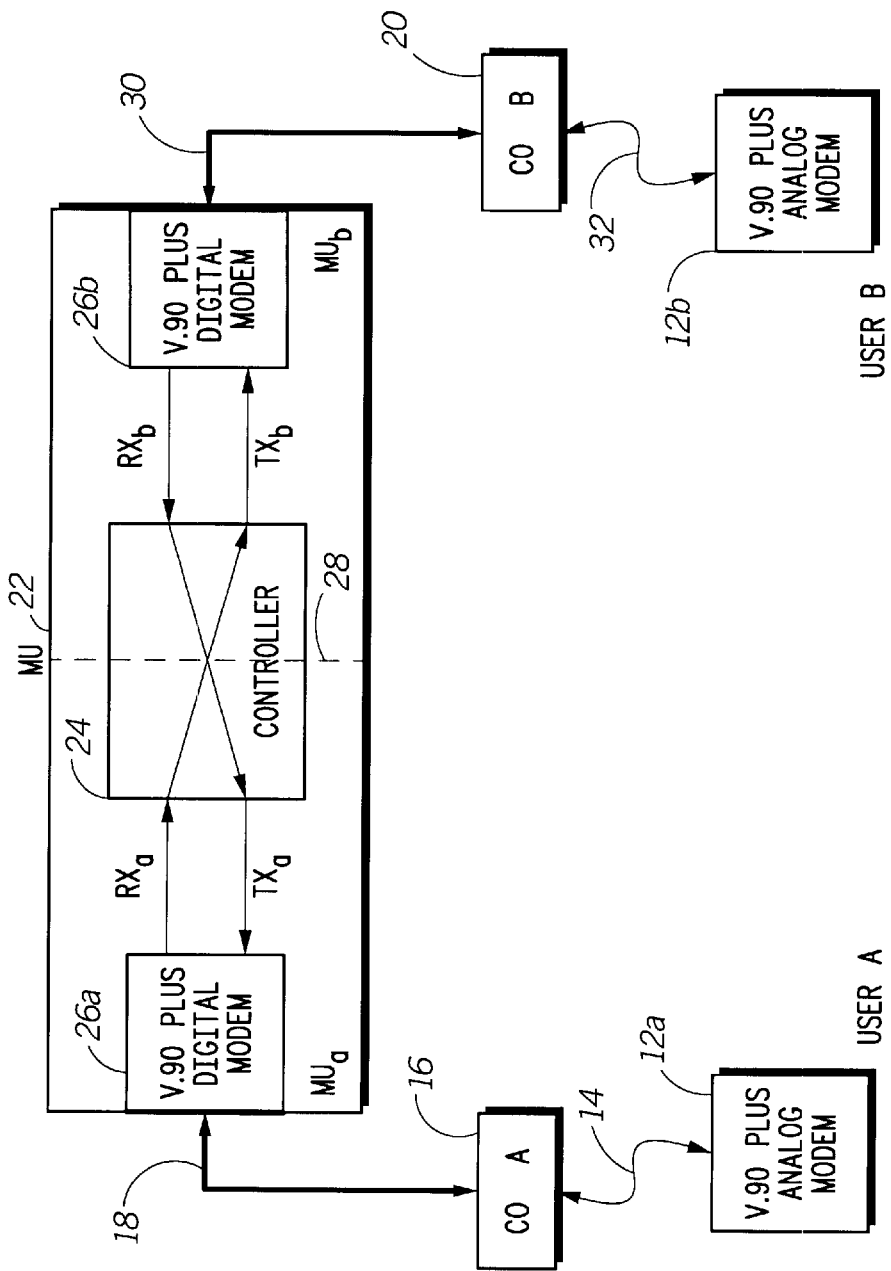
FIG. 1 is a block diagram of a point-to-point connection using the present invention.

An example point-to-point connection 10 utilizing the present invention is shown in FIG. 1. User A initiates a call using their analog modem 12a. The call is carried over an analog local loop 14 to the CO (Central Office) A, 16. From this point the call is converted and is carried digitally all the way to CO B, 20. Then the call is converted back to analog and carried over an analog local loop 30 to user B (using user B's analog modem 12b).

Both user A and B are using next generation ITU-TV.90 analog PCM modems 12, which utilizes PCM modulation in both directions of the call, currently being developed in ITU and TR30.1 Standard Committees and referred to as ITU-TV.90 Issue 2 modem. This new standard will be numbered ITU-TV.92 when finalized. Such modems 12 are described in co-pending patent application Ser. No. 09/390,106, filed on Sep. 3, 1999 and entitled "METHOD AND APPARATUS FOR A START-UP PROCEDURE FOR DIGITAL AND ANALOG MODEMS UTILIZING PULSE CODE MODULATION FOR DATA TRANSMISSION", assigned to Motorola Inc. and incorporated herein by reference.

The present invention takes advantage of PCM modem technology in both directions of a call to establish a highest possible (symmetrical or nonsymmetrical) rate over dial-up connections. An illustrative embodiment of the present invention is referred to as a Multimedia Unit (MU) 22 which includes a controller unit 24 plus two (or more) V.90Plus digital PCM modems 26. The MU 22 can be split into two segments as shown in by the dotted line 28 and discussed hereinafter. Typically the MU 22 is located either at the phone company, ISP (internet service provider), or a stand-alone gateway.

User A's call is intercepted by MU 22 section "a" (the MUa modem 26a). This can be accomplished for example by user A dialing an access code like 10111, or dialing into an 800 gateway, followed by user B's phone number, as disclosed in the patent application Ser. No. 09/479,679 described hereinbefore. At this point the MUa modem 26a establishes an ITU-TV.92 session with the modem 12A for user A. Highest possible rates in both directions of call are established based on the startup procedure (including negotiation) described in the ITU-TV.92 Specification, or in patent application Ser. No. 09/390,106 described hereinbefore. Once the connection is established, modems 12a and 26a will keep the line alive by transmitting scrambled ones sequence and await the controller command to open up the channel for user data traffic.

At the same time that the MUa modem 26a is establishing an ITU-TV.92 session with modem 12A, the controller 24 commands the MUb modem 26b to initiate a call to user B's modem 12b and attempt to establish an ITU-TV.92 session. The call is carried over a digital connection 30 to the CO B 20 supporting the local analog line 32 to user B's modem 12b. The MUb modem 26b and modem 12b establish an ITU-TV.92 session in a similar manner as done by the MUa modem 26a and modem 12a. After both the MUa modem 26a and MUb modem 26b have successfully established concurrent ITU-TV.92 sessions, the controller 24 determines the lowest receive or upstream (from end points to the controller) rate. The transmit rate TXa for the MUa modem 26a should be greater than or equal to the receive rate RXb of the MUb modem 26b and the transmit rate TXb for the MUb modem 26b should be greater than or equal to the receive rate RXa of MUa digital modem RXa. Due to practical issues regarding the PCM modem technology in the upstream path, for the illustrative embodiment, the receive rates RXa for the MUa modem 26a and RXb for the MUb modem 26b almost always will be lower than the transmit rates TXb for the MUb modem 26b and TXa for the MUa modem 26a. This avoids overflow and/or the need for buffering between the digital modems 26. In the case where the upstream receive rate is higher than its corresponding transmit rate, the controller shall clamp the receive rate by commanding the digital modem to re-negotiate its upstream rate to less than or equal to the other digital modem transmit rate in order to avoid a fault condition.

Should symmetrical data transmission rates be required or desired between users A and B, after the controller 24 has determined the lower receive rates between RXa and RXb, it instructs both digital modems 26 to re-negotiate their connection to the user modems 12, such that the transmit rate of each modem 12 is equal to receive rate of the other modem 12. The same can be done for any user configured rates by setting rate masks for initial startup for each modem, or renegotiating to the desired rate after initial set up.

Finally, the controller 24 bridges the receive port of MUa to transmit port of MUb and bridges the receive port of MUb to transmit port of MUa. At this time a full duplex connection is established between user A and B. The controller continues to monitor both digital modems' status for retrain and rate re-negotiation and insures the symmetry and transparency of the call to the end users.

Figure 2:
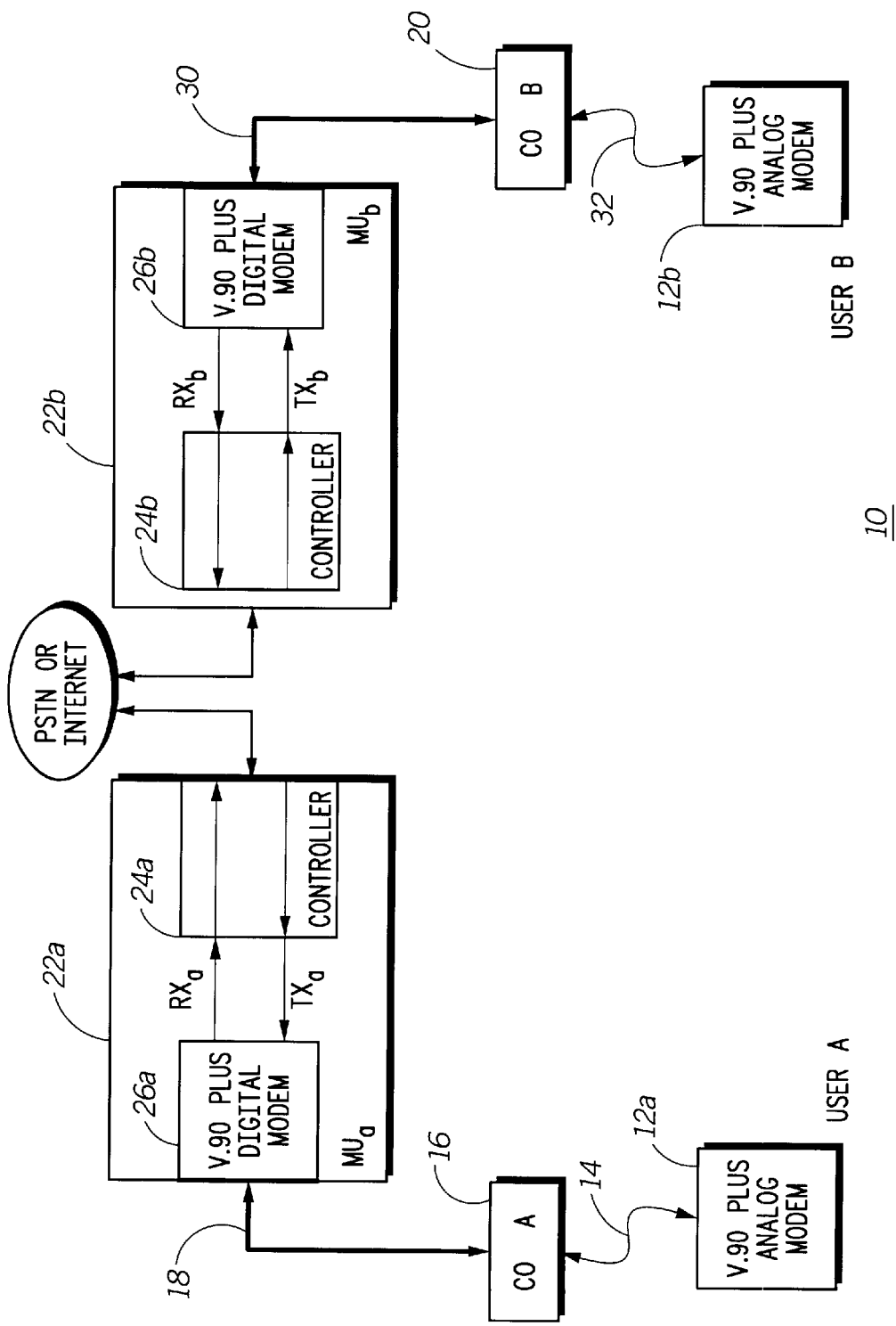
FIG. 2 is a block diagram of an alternative embodiment of the point-to-point connection of FIG. 1.

An alternative embodiment of the present invention is shown in FIG. 2. The MU 22 is "split" down the middle as shown by the dotted line 28, FIG. 1. The separate units MUa 22a FIG. 2 and MUb 22b are located at geographically separate locations. The connection 34 for data transmitting and receiving between the units MUa 22a and MUb 22b is carried over any available digital communication medium, including for example PSTN (Public Switched Telephone Network), Internet, WAN, LAN, H.323, etc. In the case when the connection 34 is carried over PSTN, the function is very similar to the embodiment as described in reference to FIG. 1. Where only the controller 24 FIG. 2 function is split between MUa 22a and MUb 22b, and the two sections are in contact over PSTN. Since service can be guaranteed over PSTN (e.g. T1, T3) there is no issue with QoS (Quality of Service). The link between the controller 24a–b will be a high-speed reliable digital service provided by phone companies or long distance carriers.

When the connection between MUa 22a and MUb 22b is carried over the Internet, the QoS can become a concern. The present invention overcomes this problem in that as long as the transmit rate of each digital modem 26 is greater than or equal to the receive rate of the other digital modem 26, then the synchronization can be maintained by placing smoothing buffers jitter buffers) in each controller 24 section (not shown). Given that all receive and transmit clocks are frequency and phase locked by virtue of both MU sections 22 interfacing to the Internet and the fact that both analog modem transmitters are locked to the network timing via loopback-timing methods, buffer overruns will never be an issue. Such timing methods are disclosed in U.S. Pat. No. 5,199,046 assigned to Motorola Inc. and co-pending U.S. patent application Ser. No. 09/491,768 entitled "METHOD AND APPARATUS FOR SYNCHRONIZATION OF DIGITAL RATE CONVERTERS TO AVOID ERROR ACCUMULATION", assigned to Motorola, Inc. both which are incorporated herein by reference. Each controller 24 section can detect buffer under-runs. The controller then commands the digital modem 26 transmitter to send sync flags, and maintain the channel until such time that it detects the arrival of user data send from the other controller 24 section. There are means to indicate the desired QoS within Internet Protocol.

Although the embodiment illustrated in FIG. 2 shows only two MU sections 22a–b with a point-to-point connection 34 between them, the present invention also supports point-to-multipoint connections, wherein a plurality of MU sections 22 are interconnected over the connection 34 medium. This allows for multicast or broadcast scenarios with multiple parties, for example real-time video teleconferencing with several geographically separate users forming a conference panel supported by real-time.

The controller 24 can be any micro-controlled intelligent bridge connector, along with microcode and/or circuitry for establishing digital telephone connections etc. If the controller is split with the MU 22 as shown in FIG. 2 for use over a network, the controller 24 can be any processing unit which includes sockets and connections and portals for sending and receiving network data. The controller 24 can be implemented in many different ways, including in hardware or software or any combination thereof.

The present invention can be implemented and/or installed at several points in the connection path. For example, a telephone Central Office (CO) can use the present invention in an integrated line card, connecting to a digital line or an analog line (with the appropriate D/A conversion performed at a telephone analog-to-digital line connection). The present invention can also be integrated into phone switches for infrastructure or in PBX systems. The present invention can be offered by alternate telephone service providers with their own public or private digital infrastructure, or by other entities such as Internet Service Providers, cable or other media providers.

Figure 3:
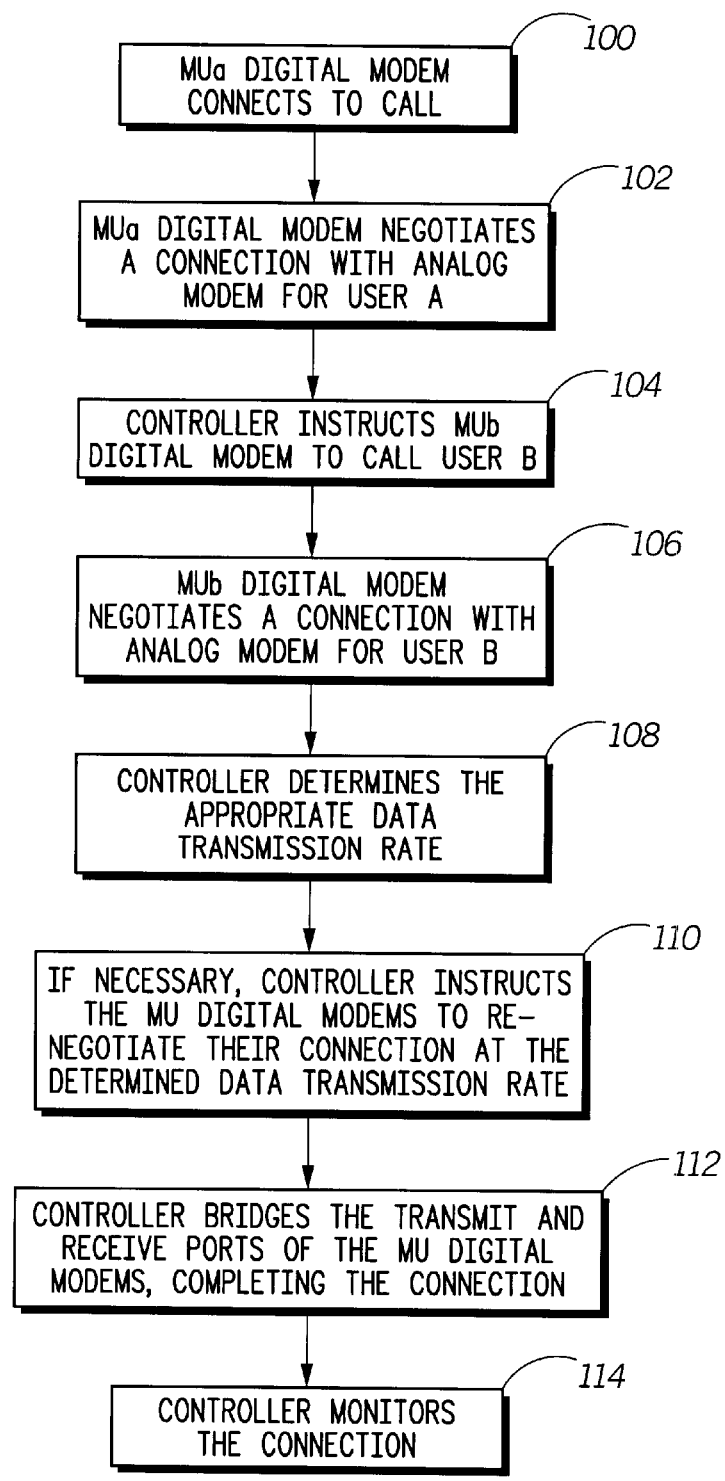
FIG. 3 is a flow chart of steps performed according to an embodiment of the present invention.

The present invention performs functions as generally illustrated in FIG. 3. In step 100, the MUa digital modem 26a of FIG. 2 connects to a call. Typically the call is an incoming call from a user, however, the call can also be dialed and originate from the MUa digital modem 26a, depending on the situation. The MUa digital modem 26a negotiates a connection with the analog modem for the user, step 102. The Controller receives notification from the MUa digital modem 26a (unless the controller originated the call) and instructs the MUb digital modem 26b to call the appropriate party, step 104. If the controllers are separate, then the first controller 24a would instantiate a connection to the second controller 24b over the PSTN or network etc. and send appropriate instructions to the second controller 24b, who then instructs the MUb digital modem 26b. The MUb digital modem 26b calls and negotiates a connection with the analog modem for second user, step 106.

With the two connections negotiated, the controller 24 is informed of the negotiated rates, determines the appropriate data transmission/receiving rate for each connection, step 108. There are several factors which determine the appropriate rate. As previously discussed, often the appropriate rate is the fastest available symmetrical or near-symmetrical data transmission rate. However, other choices include a user-selectable minimum rate, wherein a user may not need the highest available rate and selects a lower minimum rate (which may have lower toll charges than a connection that guarantees a certain minimum data transmission rate or QoS). Other user-selectable choices would be when symmetrical or near-symmetrical data transmission rate is not needed, and the user prefers or can accept a non-symmetrical data transmission rate. For example, the user may know that a much higher downstream (or upstream) data transmission rate is required, while the data transmission rate for the other direction is not important.

Having determined the appropriate data transmission rate, the controller instructs the MU digital modems to re-negotiate their connection (if necessary) at the determined data transmission rate, step 110. The controller 24 then instantiates communication by bridging the transmit and receive ports of the MU digital modems, thereby completing the connection, step 112. The parties are then free to transmit and receive data. The controller may monitor the connection, step 114. For example if either MU digital modem reports too many errors, the controller can repeat steps 108–112 to select and implement a different data transmission rate which would decrease the errors. Alternatively, a user may send instructions requesting a change in data transmission rates, or symmetrical requirements.

When the data transmission is complete, the MU digital modems terminate their connections, and the controller disconnects the connection between the MU digital modems.

Although the invention has been shown and described with respect to illustrative embodiments thereof, various changes, omissions and additions in the form and detail thereof may be made therein without departing from the spirit and scope of the invention.

What is claimed is:

1. A method for connecting a first and a second analog modems at a first and a second end point respectively, through a digital backbone wherein said first and second end points include analog connection lines, and wherein said first and second analog modems utilize PCM (pulse code modulation) in both directions, comprising:

connecting said first analog modem coupled to a first analog connection line to said first end point, through a first digital modem coupled to a first digital connection line which communicates with said first analog connection line;

negotiating a first data transmission/receiving rate between said first analog modem and said first digital modem;

connecting a second analog modem coupled to a second analog connection line to said second end point, through a second digital modem coupled to a second digital connection line which communicates with said second analog connection line;

negotiating a second data transmission/receiving rate between said second analog modem and said second digital modem;

determining an appropriate data transmission/receiving rate based on said first and second negotiated data transmission/receiving rates; and based on said determined appropriate data transmission/receiving rate, re-negotiating said data transmission/receiving rate between said first analog modem and said first digital modem, and said data transmission/receiving rate between said second analog modem and said second digital modem.

2. The method of claim 1 wherein said step of determining an appropriate data transmission/receiving rate based on said previously negotiated data transmission/receiving rates includes selecting a symmetrical data transmission/receiving rate.

3. The method of claim 2 wherein said selected symmetrical data transmission/receiving rate is a lowest one of said first and second negotiated data transmission/receiving rate.

4. The method of claim 1 wherein said step of determining an appropriate data transmission/receiving rate based on said previously negotiated data transmission/receiving rates includes selecting a near-symmetrical data transmission/receiving rate.

5. The method of claim 4 wherein said selected near-symmetrical data transmission/receiving rate is a lowest one of said first and second negotiated data transmission/receiving rate.

6. The method of claim 1 further including:

bridging said data communications between said first and second digital modems to instantiate communications.

7. The method of claim 6 wherein said step of bridging data communications between said first and second digital modems includes instantiating a connection over a private network, Internet, or World Wide Web.

8. The method of claim 6 wherein said step of bridging data communications between said first and second digital modems includes instantiating a connection over a WAN, LAN or H.323 standard network.

9. A multimedia apparatus, to provide for connecting a first and second end points through a digital backbone wherein said first and second end points include analog connection lines, said apparatus comprising:

a digital PCM modem, to connect by a telephone connection to a first analog modem coupled to said first end point, wherein upon connection said digital PCM modem negotiates a first data transmission/receiving rate with said first analog modem;

a controller component, in communication with said digital PCM modem, said controller component to connect to a second multimedia apparatus over a digital communications path;

wherein when said second multimedia apparatus connects by a telephone connection to a second analog modem to said second end point, said controller component communicates with said second multimedia apparatus to determine an appropriate complete connection data transmission/receiving rate; and said controller component instructs said digital PCM modem to renegotiate said first data transmission/receiving rate with said first analog modem, based on said determined complete connection data transmission/receiving rate.

10. The multimedia apparatus of claim 9 wherein said digital communications path includes a public switched telephone network (PSTN).

11. The multimedia apparatus of claim 9 wherein said digital communications path is over a private network, Internet, or World Wide Web.

12. The-multimedia apparatus of claim 9 wherein said digital communications path is over a LAN, WAN, or H.323 standard network.

13. The multimedia apparatus of claim 9 wherein said multimedia apparatus is incorporated into a telephone line card.

* * * * *